US009960645B2

(12) United States Patent
Röer et al.

(10) Patent No.: US 9,960,645 B2
(45) Date of Patent: May 1, 2018

(54) SYNCHRONOUS GENERATOR STATOR AND SYNCHRONOUS GENERATOR

(71) Applicant: Wobben Properties GmbH, Aurich (DE)

(72) Inventors: Jochen Röer, Ganderkesee (DE); Manuel Feith, Esens (DE); Torsten Jepsen, Aurich (DE)

(73) Assignee: Wobben Properties GmbH, Aurich (DE)

( * ) Notice: Subject to any disclaimer, the term of this patent is extended or adjusted under 35 U.S.C. 154(b) by 295 days.

(21) Appl. No.: 14/888,064

(22) PCT Filed: Apr. 11, 2014

(86) PCT No.: PCT/EP2014/057377
§ 371 (c)(1),
(2) Date: Oct. 29, 2015

(87) PCT Pub. No.: WO2014/177363
PCT Pub. Date: Nov. 6, 2014

(65) Prior Publication Data
US 2016/0087492 A1 Mar. 24, 2016

(30) Foreign Application Priority Data
Apr. 30, 2013 (DE) .................. 10 2013 207 931

(51) Int. Cl.
*H02K 19/00* (2006.01)
*H02K 19/38* (2006.01)
(Continued)

(52) U.S. Cl.
CPC ............... *H02K 1/18* (2013.01); *F03D 3/002* (2013.01); *H02K 1/185* (2013.01); *H02K 5/24* (2013.01);
(Continued)

(58) Field of Classification Search
CPC . H02K 1/18; H02K 1/14; H02K 19/00; F03D 9/00
(Continued)

(56) References Cited

U.S. PATENT DOCUMENTS 2,632,861 A * 3/1953 Morton .................. H02K 1/185
310/431
3,546,503 A * 12/1970 Richardson .............. H02K 3/47
310/179
(Continued)

FOREIGN PATENT DOCUMENTS

CN 201887596 U 6/2011
CN 102714445 A 10/2012
(Continued)

*Primary Examiner* — Jose Gonzalez Quinones
(74) *Attorney, Agent, or Firm* — Seed Intellectual Property Law Group LLP

(57) ABSTRACT

The invention provides a synchronous-generator stator, comprising a stator ring, a stator core, a circumferential gap between the stator ring and the stator core, and a plurality of decoupling units in the gap, wherein the decoupling unit has a first plate, which is matched to a contour of the stator core, and has a second plate, which is matched to the contour of the stator ring, wherein a mat, having a cavity and an inlet valve, is provided between the first and the second plate.

7 Claims, 6 Drawing Sheets

(51) Int. Cl.
*H02K 1/06* (2006.01)
*F03D 9/00* (2016.01)
*H02K 1/18* (2006.01)
*H02K 5/24* (2006.01)
*H02K 7/18* (2006.01)
*F03D 3/00* (2006.01)
*H02K 19/16* (2006.01)

(52) U.S. Cl.
CPC ........... *H02K 7/1838* (2013.01); *H02K 19/16* (2013.01); *Y02E 10/725* (2013.01)

(58) Field of Classification Search
USPC ...... 310/112, 162, 216.008, 216.009; 290/44
See application file for complete search history.

(56) References Cited

U.S. PATENT DOCUMENTS

| | | | |
|---|---|---|---|
| 5,869,912 A | 2/1999 | Andrew et al. | |
| 6,517,328 B2 | 2/2003 | Makino et al. | |
| 6,770,996 B2* | 8/2004 | Yoshida | H02K 5/15 |
| | | | 310/201 |
| 7,064,503 B2 | 6/2006 | Marx et al. | |
| 7,511,399 B2 | 3/2009 | Lung et al. | |
| 8,648,503 B2 | 2/2014 | Kessler et al. | |
| 2010/0045047 A1* | 2/2010 | Stiesdal | H02K 7/1838 |
| | | | 290/55 |
| 2011/0266913 A1* | 11/2011 | Zirin | H02K 1/148 |
| | | | 310/216.009 |

FOREIGN PATENT DOCUMENTS

| | | |
|---|---|---|
| DE | 2838737 A1 | 3/1980 |
| DE | 10063337 A1 | 6/2001 |
| DE | 102007040339 A1 | 3/2009 |
| EP | 1143599 A2 | 10/2001 |
| FR | 2979768 A1 | 3/2013 |
| JP | 61-258635 A | 11/1986 |
| JP | 61/295839 A | 12/1986 |
| JP | 11-252850 A | 9/1999 |
| JP | 2001-74091 A | 3/2001 |
| JP | 2010-230108 A | 10/2010 |
| JP | 2011015536 | 1/2011 |
| RU | 2046496 C1 | 10/1995 |
| RU | 2210157 C2 | 8/2003 |
| WO | 2005081379 A2 | 9/2005 |

* cited by examiner

SYNCHRONOUS GENERATOR STATOR AND SYNCHRONOUS GENERATOR

BACKGROUND

Technical Field

The present invention relates to a synchronous-generator stator and to a synchronous generator.

Description of the Related Art

Synchronous generators are used, for example, in wind turbines, and have a generator stator and a generator rotor. The generator stator is typically fixedly connected to a nacelle of a wind turbine, and the generator rotor is coupled directly or indirectly (via a transmission) to a rotor of the wind turbine. As the rotor of a wind turbine rotates, the generator rotor of the synchronous generator thus rotates concomitantly, such that the synchronous generator generates electrical energy.

BRIEF SUMMARY

One or more embodiments of the invention is to provide a synchronous generator for a wind turbine that makes it possible to achieve a reduction in acoustic emission.

One embodiment of the invention provides a synchronous-generator stator, comprising a stator ring, a stator core, a circumferential gap between the stator ring (or its inner or outer contour) and the stator core (or its outer or inner core), and a plurality of decoupling units in the gap.

The decoupling unit has a first plate, which is matched to the (outer) contour of the stator core, and has a second plate, which is matched to the (inner) contour of the stator ring. A mat, having a cavity and an inlet valve, is provided between the first and the second plate.

The gap may be in the form of an annular gap.

The cavity can be filled with a pressure medium, through the inlet valve.

According to one aspect of the present invention, the mat is designed as a vulcanized-in rubber pressure mat.

One embodiment of the invention also relates to a synchronous generator comprising a synchronous-generator stator according to the invention.

Another embodiment of the invention also relates to a method for mounting a synchronous-generator stator that has a stator ring and a stator core. The stator core is inserted in a stator ring, such that there is a circumferential gap between a contour of the stator ring and a contour of the stator core. A plurality of decoupling units are inserted in the gap.

According to a further aspect of the present invention, a pressure medium is introduced into the decoupling unit, via an inlet valve, in order to fill a cavity of the mat between the first and the second plate, after the plurality of decoupling units have been inserted in the gap.

Another embodiment of the invention also relates to a wind turbine having a synchronous generator comprising a synchronous-generator stator.

Yet another embodiment of the invention relates to a concept of providing a synchronous-generator stator that has a plurality of decoupling units in a gap between a stator ring and a stator core. These decoupling units may be provided in order to avoid transmission of vibrations or structure-borne noise from the stator core to the stator ring.

According to one aspect of the invention, a decoupling element has an outer and an inner plate part, and has a flexible mat such as, for example, a rubber pressure mat between these parts.

The synchronous generator may be designed as an internal rotor, i.e., the rotor of the generator is provided inside the stator.

The mat between the two plates of the decoupling unit may have a cavity, such that a pressure medium can be introduced into this cavity. The decoupling elements may thus first be inserted, without a pressure medium, in the gap between the stator ring and the stator core, in order then subsequently to introduce a pressure medium, such that the decoupling elements fill the gap between the stator ring and the stator core (with increase in thickness).

Further designs of the invention constitute subject-matter of the dependent claims.

BRIEF DESCRIPTION OF THE SEVERAL VIEWS OF THE DRAWINGS

Advantages and exemplary embodiments of the invention are explained in greater detail in the following with reference to the drawings.

DETAILED DESCRIPTION

Figure 1:
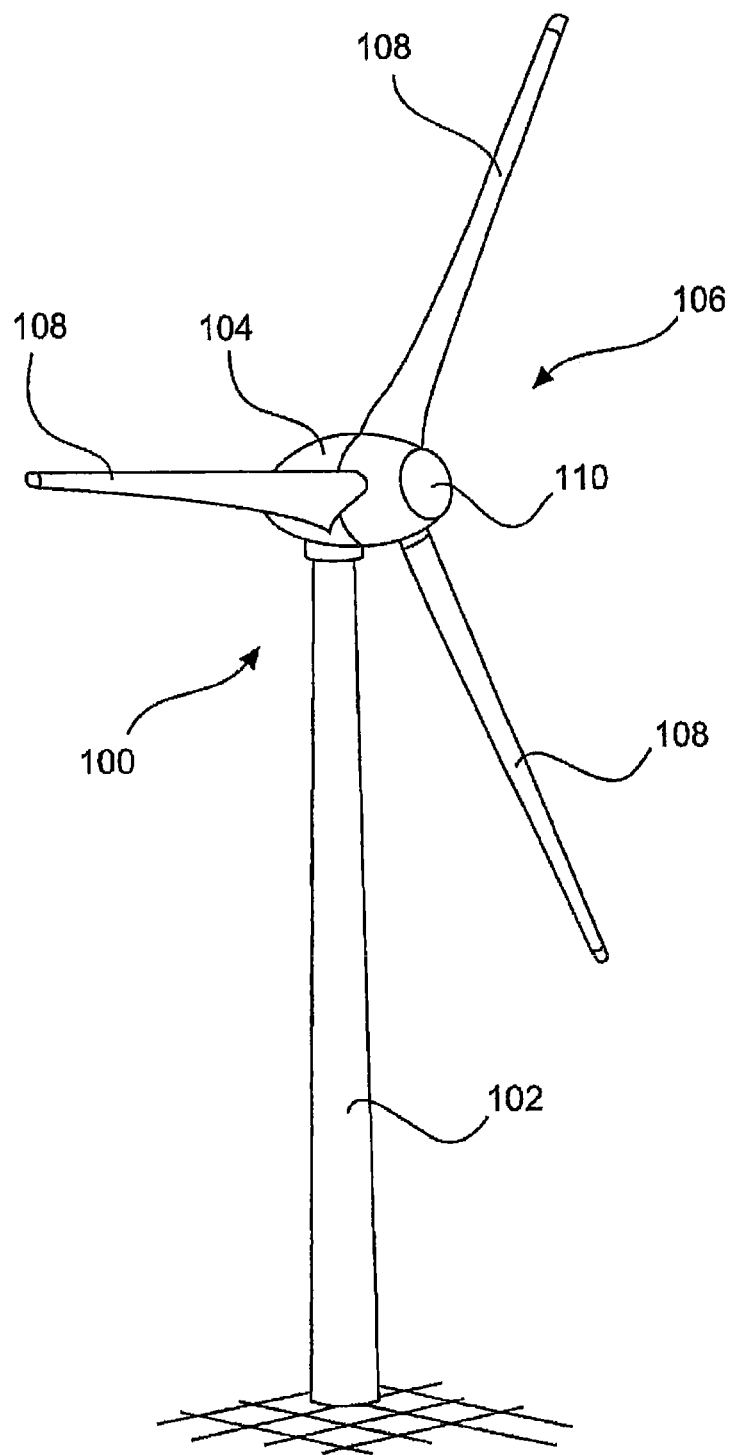
FIG. 1 shows a schematic representation of a wind turbine according to the invention.

FIG. 1 shows a schematic representation of a wind turbine according to the invention. The wind turbine 100 has a tower 102 and a nacelle 104. A rotor 106, having three rotor blades 108 and a spinner 110, is provided on the nacelle 104. When in operation, the rotor 106 is put into a rotary motion by the wind, and thus also rotates the rotor of a synchronous generator in the nacelle 104. The pitch angle of the rotor blades 108 can be altered by pitch motors at the blade roots of the respective rotor blades 108.

The synchronous-generator stator of the synchronous generator is typically fixedly connected to the nacelle of the wind turbine, while the rotor of the synchronous generator is coupled directly (or via a transmission) to the aerodynamic rotor of the wind turbine, such that the generator rotor rotates when the aerodynamic rotor of the wind turbine rotates.

The realization of an internal rotor is described in the following. In the case of an external rotor, "inner" and "outer" are to be interchanged.

Figure 2:
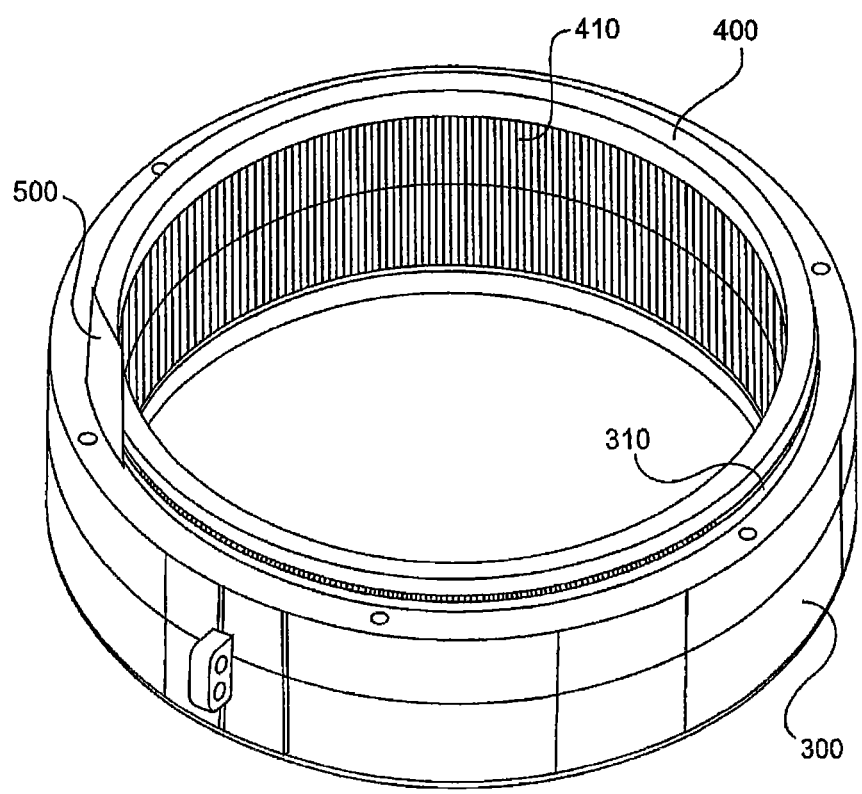
FIG. 2 shows a perspective representation of a synchronous-generator stator according to a first exemplary embodiment, FIGS. 3A and 3B each show a perspective view of a decoupling unit for a synchronous generator stator according to the first exemplary embodiment.

FIG. 2 shows a perspective representation of a synchronous-generator stator according to a first exemplary embodiment. The stator has an outer stator ring 300, an inner stator core 400, and a circumferential gap 310 between the outer surface of the stator core 400 and the inner surface of the stator ring 300. A plurality of decoupling units 500 are provided in this circumferential gap 310. The decoupling units 500 serve to decouple vibration and/or structure-borne noise between the stator core 400 and the stator ring 300.

Figure 3A:
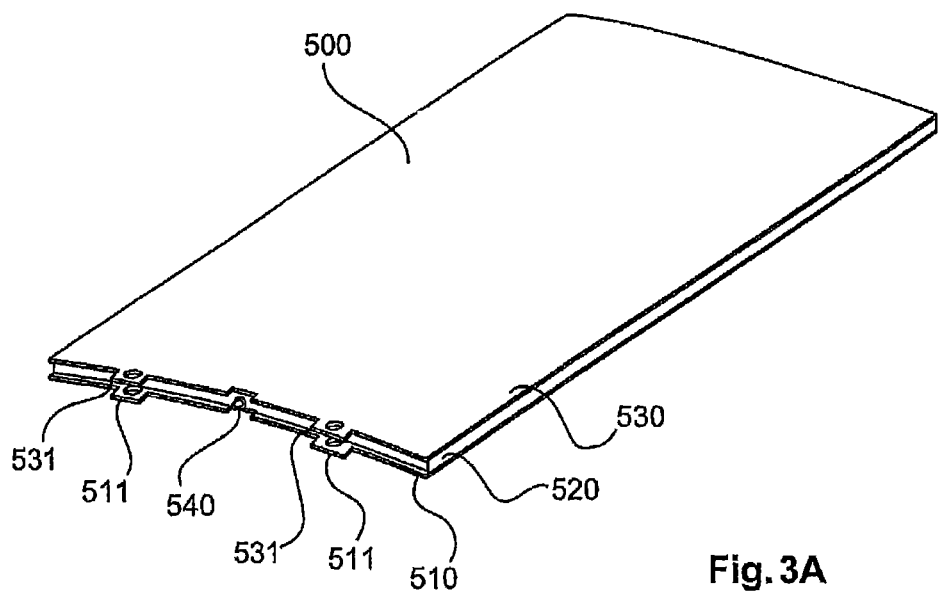
Figure 3B:
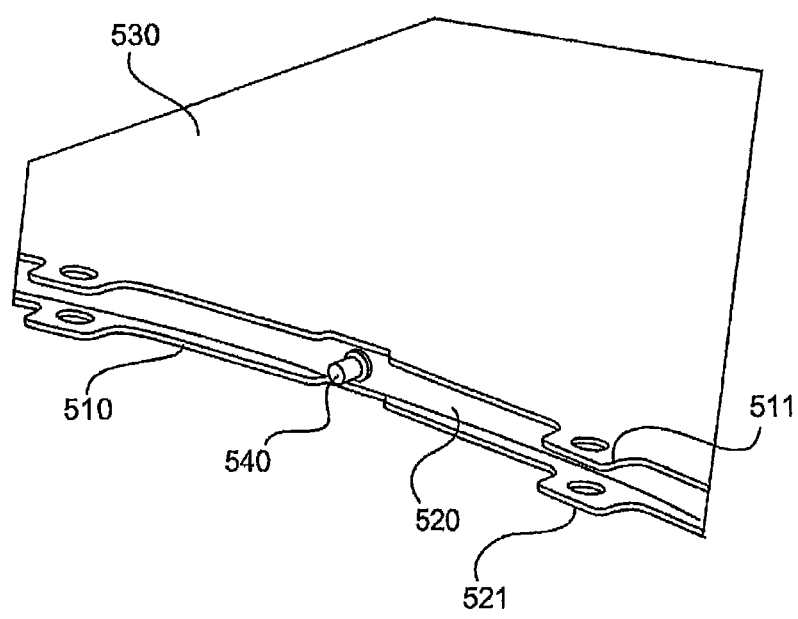

FIGS. 3A and 3B each show a perspective view of a decoupling unit for a synchronous-generator stator according to the first exemplary embodiment. The decoupling unit 500 has first and second plates 510, 530, and has a mat 520 between the first and the second plates 510, 530. The first plate 510 is matched to the outer contour of the stator core 400. The second plate 530 is matched to the inner contour of the stator ring 300. The decoupling units 500 are arranged in the manner of circle segments in the circumferential gap 310. Two fastening lugs 511, for example, may be provided on the first plate 510, and two fastening lugs 531 may be provided on the second plate 530. These lugs 511, 531 are provided on an end face of the decoupling unit 500. The mat 520 between the first and the second plates 510, 530 may have a cavity that can be filled with a pressure medium, via an inlet valve 540 on the end face of the decoupling unit 500.

According to one aspect of the present invention, the first and the second decoupling plate are approximately 2 mm thick, and the mat 520 is constituted by a vulcanized rubber pressure mat.

Figure 4:
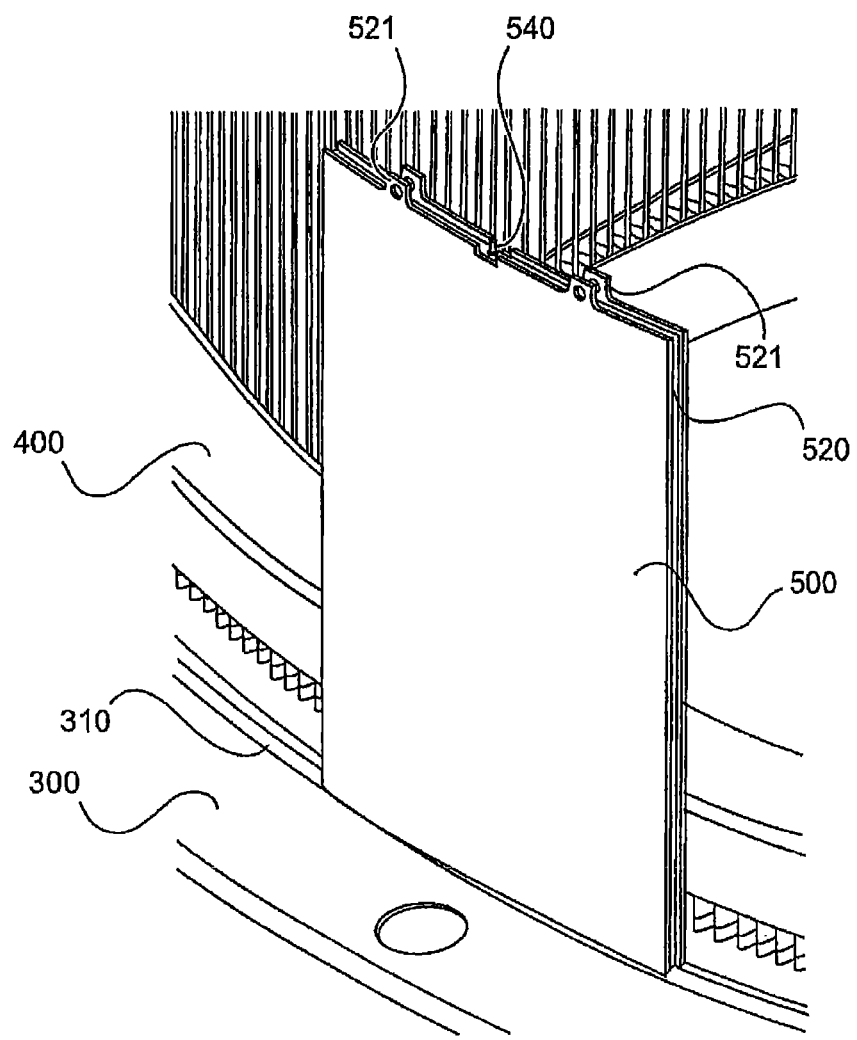
FIG. 4 shows a schematic, perspective view of a portion of the synchronous generator according to the first exemplary embodiment.

FIG. 4 shows a schematic, perspective view of a portion of the synchronous generator according to the first exemplary embodiment. In particular, FIG. 4 shows a decoupling element 500 when inserted in a circumferential gap 310 between the stator ring 300 and the stator core 400. In this case, the decoupling element 500 is inserted in the gap 310. Optionally in this case, the mat 520 may be provided, for example, between the first and the second plate 510, 530 without a pressure medium, such that it is more easily inserted.

Figure 5:
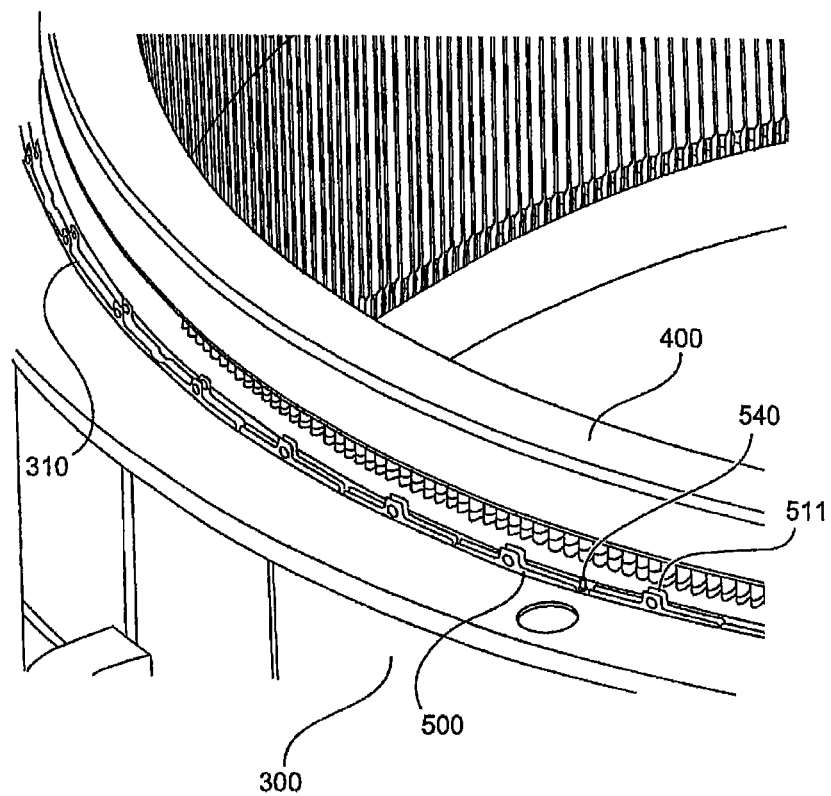
FIG. 5 shows a further schematic, perspective view of a portion of the synchronous-generator stator according to the first exemplary embodiment.

FIG. 5 shows a further schematic, perspective view of a portion of the synchronous-generator stator according to the first exemplary embodiment. The synchronous-generator stator has a stator ring 300, a stator core 400, and a circumferential gap 310 between the stator ring 300 and the stator core 400. A plurality of decoupling units 500 are placed, or inserted, in this gap. After the decoupling units 500 have been inserted in the circumferential gap 310, a pressure medium can be introduced into the cavity of the mat 520 by means of the inlet valve 540. This has the result that the distance between the first and the second plate 510, 530 is increased, until the first plate bears against the outer contour of the stator core 400 and the second plate 530 bears against the inner contour of the stator ring 300.

Figure 6:
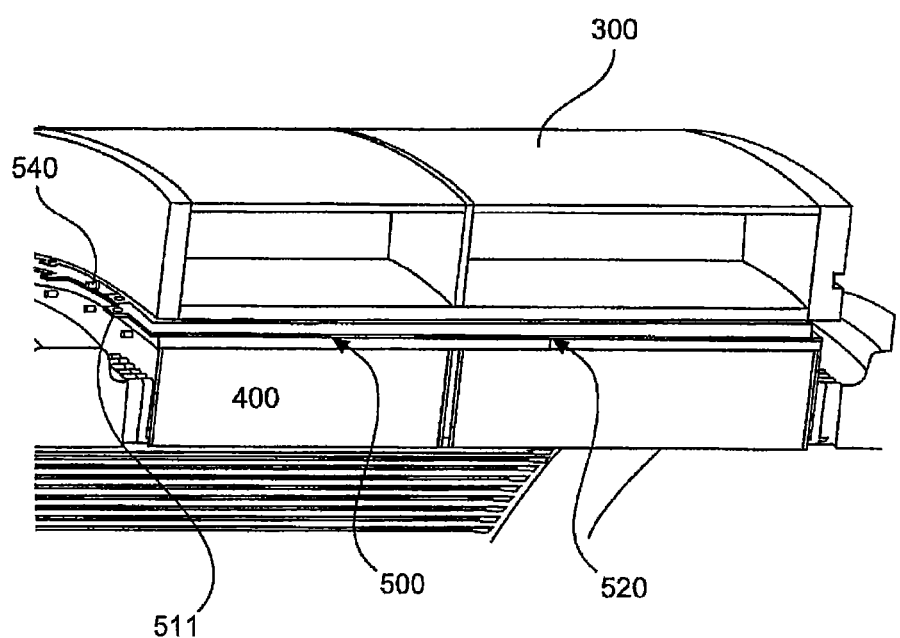
FIG. 6 shows a perspective sectional view of a synchronous-generator stator according to the first exemplary embodiment.

FIG. 6 shows a perspective sectional view of a synchronous-generator stator according to the first exemplary embodiment. The synchronous-generator stator has a stator ring 300, a stator core 400, and a gap 310 between the stator ring 300 and the stator core 400. A plurality of decoupling units 500 are provided in this gap 310. The decoupling unit 500 has a first and a second plate 510, 530, and has a mat 520 between these plates. The design of the decoupling units according to FIG. 6 may be based on a decoupling unit according to FIGS. 3A and 3B.

The decoupling units are thus provided between the stator core 400 and the stator ring 300.

A pressure medium can be introduced into the cavity of the mat by means of the inlet valve 540, such that the gap between the stator ring 300 and the core 400 can be filled and pressure-injected for the purpose of transmitting torque. The decoupling elements can also be used for setting the air gap of the generator.

The use of the decoupling units in the gap between the stator ring 300 and the stator core makes it possible to provide decoupling of structure-borne noise and/or decoupling of vibration, such that the acoustic emission of the synchronous generator can be reduced considerably.

The synchronous generator is constituted by a slowly rotating synchronous generator, and in particular a ring generator, for a wind turbine or hydropower installation. The synchronous generator has a rated power of >1 MW. The synchronous generator has a rotational speed of under 40 rpm, and in particular of under 20 rpm.

Provided is a synchronous generator having a diameter of >4 m. Moreover, the synchronous generator is designed as a separately excited synchronous generator.

The invention claimed is:

1. A synchronous-generator stator, comprising:
   a stator ring;
   a stator core;
   a circumferential gap between the stator ring and the stator core; and
   a plurality of decoupling units in the gap, wherein each of the plurality of decoupling units has:
      a first plate having a contour that is matched to a contour of the stator core;
      a second plate having a contour that is matched to a contour of the stator ring; and
      a mat having a cavity and an inlet valve, the mat being located between the first and the second plate.

2. The synchronous-generator stator according to claim 1, wherein each of the mats is a vulcanized rubber pressure mat.

3. A synchronous generator, comprising:
   a synchronous-generator stator, having:
      a stator ring;
      a stator core;
      a circumferential gap between the stator ring and the stator core; and
      a plurality of decoupling units in the gap, wherein the plurality of decoupling units have:
         a first plate having a contour corresponding to a contour of the stator core;
         a second plate having a contour corresponding to a contour of the stator ring; and
         a mat provided between the first and the second plate, the mat having a cavity and an inlet valve.

4. A wind turbine comprising a synchronous generator according to claim 3.

5. A method for mounting a synchronous-generator stator that has a stator ring and a stator core, the method comprising the steps:
   inserting the stator core in the stator ring such that there is a circumferential gap between the stator ring and the stator core;
   inserting a plurality of decoupling units in the gap, the plurality of decoupling units having a first plate having a contour corresponding to a contour of the stator core and has a second plate having a contour corresponding to a contour of the stator ring, each of the plurality of decoupling units including a mat between the first and the second plates, the mat having a cavity and an inlet valve; and
   introducing a pressure medium through the inlet valves of the plurality of decoupling units and filling the cavity of the mats between the first and second plates.

6. The synchronous generator according to claim 3, further comprising a pressure medium in the cavity of the mat.

7. The synchronous generator according to claim 3, wherein the mat is a vulcanized rubber pressure mat.

* * * * *